(12) United States Patent
Ackermann et al.

(10) Patent No.: US 12,320,270 B2
(45) Date of Patent: Jun. 3, 2025

(54) GAS TURBINE ENGINE WITH BYPASS TOBI COOLING/PURGE FLOW AND METHOD

(71) Applicant: Raytheon Technologies Corporation, Farmington, CT (US)

(72) Inventors: William K. Ackermann, East Hartford, CT (US); Brian F. Hilbert, Coventry, CT (US); Paul A. Sicard, East Hartford, CT (US); Andrew E. Breault, Bolton, CT (US); Rishon Saftler, Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 40 days.

(21) Appl. No.: 18/130,872

(22) Filed: Apr. 4, 2023

(65) Prior Publication Data

US 2024/0337187 A1    Oct. 10, 2024

(51) Int. Cl.
  *F01D 5/08*   (2006.01)
  *F02C 9/18*   (2006.01)
  *F02C 3/06*   (2006.01)
  *F02C 7/18*   (2006.01)

(52) U.S. Cl.
  CPC ............. *F01D 5/081* (2013.01); *F01D 5/082* (2013.01); *F02C 9/18* (2013.01); *F02C 3/06* (2013.01); *F02C 7/18* (2013.01); *F05D 2260/606* (2013.01)

(58) Field of Classification Search
  CPC .. F01D 5/081; F01D 5/082; F02C 9/18; F02C 3/06; F02C 7/18; F05D 2260/606
  See application file for complete search history.

(56) References Cited

U.S. PATENT DOCUMENTS

| | | | | |
|---|---|---|---|---|
| 4,425,079 | A * | 1/1984 | Speak | F01D 5/081 415/115 |
| 8,336,317 | B2 | 12/2012 | Blanchard et al. | |
| 10,233,840 | B2 | 3/2019 | Hiester | |
| 10,393,024 | B2 | 8/2019 | Stevens | |
| 2008/0041064 | A1* | 2/2008 | Moore | F01D 5/081 60/785 |
| 2015/0275690 | A1* | 10/2015 | McCaffrey | F01D 1/02 416/1 |

(Continued)

OTHER PUBLICATIONS

EP Search Report for EP Patent Application No. 24168577.5 dated Sep. 3, 2024.

*Primary Examiner* — Gerald L Sung
*Assistant Examiner* — Rene D Ford
(74) *Attorney, Agent, or Firm* — Getz Balich LLC (57) ABSTRACT

A gas turbine engine is provided that includes a high pressure compressor (HPC), a combustor section, a high pressure turbine (HPT), and a bypass tangential on board injector (TOBI) system. The combustor section has a combustor. A core gas path extends through the HPC, the combustor section, and the HPT. The bypass TOBI system extends circumferentially around the engine axial centerline, and has a plurality of nozzles, inner and outer radial sides, a plurality of first type and second type radial passages configured to allow the gas from the HPC to pass from the inner radial side of the bypass TOBI system to the outer radial side of the bypass TOBI system, wherein the first type radial passages are differently configured from the second type radial passages.

20 Claims, 7 Drawing Sheets

(56) References Cited

U.S. PATENT DOCUMENTS

| | | | |
|---|---|---|---|
| 2015/0361890 A1* | 12/2015 | Suciu | ............... F02C 7/185 60/785 |
| 2017/0051621 A1 | 2/2017 | Ackermann | |
| 2022/0356842 A1 | 11/2022 | Naccache | |

* cited by examiner

GAS TURBINE ENGINE WITH BYPASS TOBI COOLING/PURGE FLOW AND METHOD

BACKGROUND OF THE INVENTION

1. Technical Field

The present disclosure relates to gas turbine engines in general and to gas turbine engine cooling air systems and secondary air configurations in particular.

2. Background Information

Gas turbine engines often operate at high temperatures. This is particularly true in the turbine section. As engine efficiency and power increases, internal temperatures may rise. As a result, gas turbine engines may depend on a cooling airflow to protect components and ensure longevity. Typically, combustor bypass air used as a cooling air may flow along various airflow paths to cool rotating blades, stator vanes, and/or other engine components. The cooling air may rise in temperature due to a variety of factors. It would be beneficial to provide a cooling system that is an improvement over known cooling systems.

Within a gas turbine engine, there is always some amount of clearance necessary between rotating components ("rotors") and stationary components ("stators"). The interface between a rotor and stator, therefore, typically presents a path for gas leakage flow. It would be beneficial to utilize leakage flow in a manner that improves the efficiency of the gas turbine engine.

SUMMARY

According to an aspect of the present disclosure, a gas turbine engine having an axial centerline is provided that includes a high pressure compressor (HPC), a combustor section, a high pressure turbine (HPT), and a bypass tangential on board injector (TOBI) system. The HPC has an HPC rotor stage and an HPC stator vane stage, the HPC rotor stage having a disk and a plurality of HPC rotor blades, and the HPC stator vane stage having a plurality of HPC stator vanes, the HPC having an HPC discharge at the aft end of the HPC. The combustor section has a combustor. The HPT has an HPT rotor stage and an HPT stator vane stage. The HPT rotor stage has a disk and a plurality of HPT rotor blades. The HPT stator vane stage has a plurality of HPT stator vanes. A core gas path extends through the HPC, the combustor section, and the HPT. The bypass TOBI system extends circumferentially around the engine axial centerline, and has a plurality of nozzles, inner and outer radial sides, a plurality of first radial passages configured to allow gas from the HPC to pass from the inner radial side of the bypass TOBI system to the outer radial side of the bypass TOBI system, and a plurality of second radial passages configured to allow gas from the HPC to pass from the inner radial side of the bypass TOBI system to the outer radial side of the bypass TOBI system. The configuration of the first radial passages may be different from the configuration of the second radial passages.

In any of the aspects or embodiments described above and herein, the gas turbine engine may further include a first gas port in communication with the HPC, the first gas port configured to receive gas from the core gas path, and a first HPC gas passage that provides fluid communication between the first gas port and the bypass TOBI system.

In any of the aspects or embodiments described above and herein, the HPC may have "N" number of said HPC rotor stages, wherein "N" is an integer equal to or greater than two, and the "N" number of HPC rotor stages includes a first HPC rotor stage disposed closest to an axial forward end of the HPC and an Nth HPC rotor stage that is the HPC rotor stage closest to the HPC discharge, and the first gas port may be disposed in the HPC aft of the Nth HPC rotor stage.

In any of the aspects or embodiments described above and herein, the first gas port and the first HPC gas passage may be configured such that substantially all of the gas received by the first gas port (first HPC gas) is directed to pass from the inner radial side of the bypass TOBI system to the outer radial side of the bypass TOBI system.

In any of the aspects or embodiments described above and herein, the plurality of HPT stator vane stages may include a first HPT stator vane stage disposed adjacent to the combustor section, and the plurality of HPT rotor stages may include a first HPT rotor stage disposed aft of the first HPT stator vane stage, and a cavity (FS-HPT rotor forward rim cavity) is disposed aft of the first HPT stator vane stage, forward of the first HPT rotor stage, and radially inside of the core gas path, and the gas turbine engine may be configured such that the first HPC gas is directed into the FS-HPT rotor forward rim cavity for exit into the core gas path forward of the first HPT rotor stage after passing radially through the bypass TOBI system.

In any of the aspects or embodiments described above and herein, the combustor section may be configured to include a diffuser outer diameter (OD) flow path disposed radially outside of the combustor and a diffuser inner diameter (ID) flow path disposed radially inside of the combustor.

In any of the aspects or embodiments described above and herein, the combustor section may be configured such that a first portion of gas exiting the HPC discharge is directed into the diffuser OD flow path, and the engine may be configured to direct the first portion of gas outside of the core gas path to the HPT.

In any of the aspects or embodiments described above and herein, the plurality of HPT stator vane stages may include a second HPT stator vane stage disposed aft of the first HPT rotor stage, and at least a portion of the first portion of gas exiting the HPC discharge may be directed to the second HPT stator vane stage.

In any of the aspects or embodiments described above and herein, the combustor section may be configured such that a second portion of gas exiting the HPC discharge may be directed into the diffuser ID flow path, and the diffuser ID flow path may be in fluid communication with the nozzles of the bypass TOBI system to direct at least some of the second portion of gas through the TOBI nozzles. In some embodiments, gas exiting the HPC discharge may be directed into the first HPT stator vane stage.

In any of the aspects or embodiments described above and herein, the plurality of first radial passages may be circumferentially spaced apart from one another around the bypass TOBI system, and the plurality of second radial passages may be circumferentially spaced apart from one another around the bypass TOBI system.

In any of the aspects or embodiments described above and herein, the first radial passages may extend from and radially through the bypass TOBI system to a first outer radial compartment.

In any of the aspects or embodiments described above and herein, a plurality of seals may be disposed on the inner radial side of the bypass TOBI system and engaged with an inner radial surface of the bypass TOBI nozzles, and a first seal of the plurality of seals and a second seal of the plurality of seals may be spaced apart from one another and define an annular region therebetween, and the second radial passages may extend from the annual region and radially through the bypass TOBI system to a second outer radial compartment.

In any of the aspects or embodiments described above and herein, the HPC may have "N" number of HPC rotor stages, wherein "N" is an integer equal to or greater than two, and the "N" number of HPC rotor stages may include a first HPC rotor stage disposed closest to an axial forward end of the HPC, an Nth HPC rotor stage that is the HPC rotor stage closest to the HPC discharge, and an N−1th HPC rotor stage disposed between the first HPC rotor stage and the Nth said HPC rotor stage, and a second gas port may be in communication with the HPC, the second gas port may be configured to receive gas from the core gas path forward of the N−1th HPC rotor stage, and the gas received from the second gas port (HPC bleed gas) may be routed through a passage disposed radially outside of the core gas path to the HPT.

In any of the aspects or embodiments described above and herein, the second gas port may be in communication with an outer wall segment forward of the N−1th HPC rotor stage, and the HPC bleed gas received from the second gas port may be routed to the HPT in unmixed form.

According to an aspect of the present disclosure, a gas turbine engine having an axial centerline is provided that includes a high pressure compressor (HPC), a combustor section, a high pressure turbine (HPT), and a bypass tangential on board injector (TOBI) system. The combustor section has a combustor. A core gas path extends through the HPC, the combustor section, and the HPT. The bypass TOBI system extends circumferentially around the engine axial centerline, and has a plurality of nozzles, inner and outer radial sides, a plurality of first and second radial passages configured to allow the gas from the HPC to pass from the inner radial side of the bypass TOBI system to the outer radial side of the bypass TOBI system, wherein the first radial passages are differently configured from the second radial passages.

In any of the aspects or embodiments described above and herein, the engine may further include a first gas port in communication with the HPC, the first gas port may be configured to receive gas from the core gas path (first HPC gas), and an HPC gas passage that provides fluid communication between the first gas port and the bypass TOBI system. The HPC may have "N" number of HPC rotor stages, wherein "N" is an integer equal to or greater than two, and the "N" number of HPC rotor stages may include a first HPC rotor stage disposed closest to an axial forward end of the HPC and an Nth HPC rotor stage that is the HPC rotor stage closest to the HPC discharge. The first gas port may be disposed in the HPC aft of the Nth HPC rotor stage, and the first gas port and the HPC gas passage may be configured such that substantially all of the first HPC gas received by the first gas port is directed to pass from the inner radial side of the bypass TOBI system to the outer radial side of the bypass TOBI system.

In any of the aspects or embodiments described above and herein, the plurality of HPT stator vane stages may include a first HPT stator vane stage disposed adjacent the combustor section and the plurality of HPT rotor stages may include a first HPT rotor stage disposed aft of the first HPT stator vane stage, and a cavity (FS-HPT rotor forward rim cavity) may be disposed aft of the first HPT stator vane stage, forward of the first HPT rotor stage, and radially inside of the core gas path, and the gas turbine engine may be configured such that the first HPC gas is directed into the FS-HPT rotor forward rim cavity for exit into the core gas path forward of the first HPT rotor stage after passing radially through the bypass TOBI system.

In any of the aspects or embodiments described above and herein, each of the first radial passages may include a first seal leak path portion disposed on the outer radial side of the bypass TOBI system.

In any of the aspects or embodiments described above and herein, each of the second radial passages may include a second seal leak path portion disposed on the inner radial side of the bypass TOBI system.

According to an aspect of the present disclosure, a method for operating a gas turbine engine having an axial centerline, a high pressure compressor (HPC), a combustor section having a combustor, and a high pressure turbine (HPT), wherein a core gas path extends through the HPC, the combustor section, and the HPT, the engine further including a bypass tangential on board injector (TOBI) system that extends circumferentially around the engine axial centerline, the bypass TOBI system having a plurality of nozzles, an inner radial side, and an outer radial side, is provided, the method comprising: receiving gas from the HPC; passing the HPC gas radially through the bypass TOBI system from the inner radial side to the outer radial side, wherein the HPC gas passes through the bypass TOBI system from the inner radial side to the outer radial side by way of a plurality of first radial passages and a plurality of second radial passages independent of one another; and purging a cavity disposed between a first HPT stator vane stage and a first HPT rotor stage with the HPC gas, the HPC gas entering the core gas path forward of the first HPT rotor stage thereafter.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
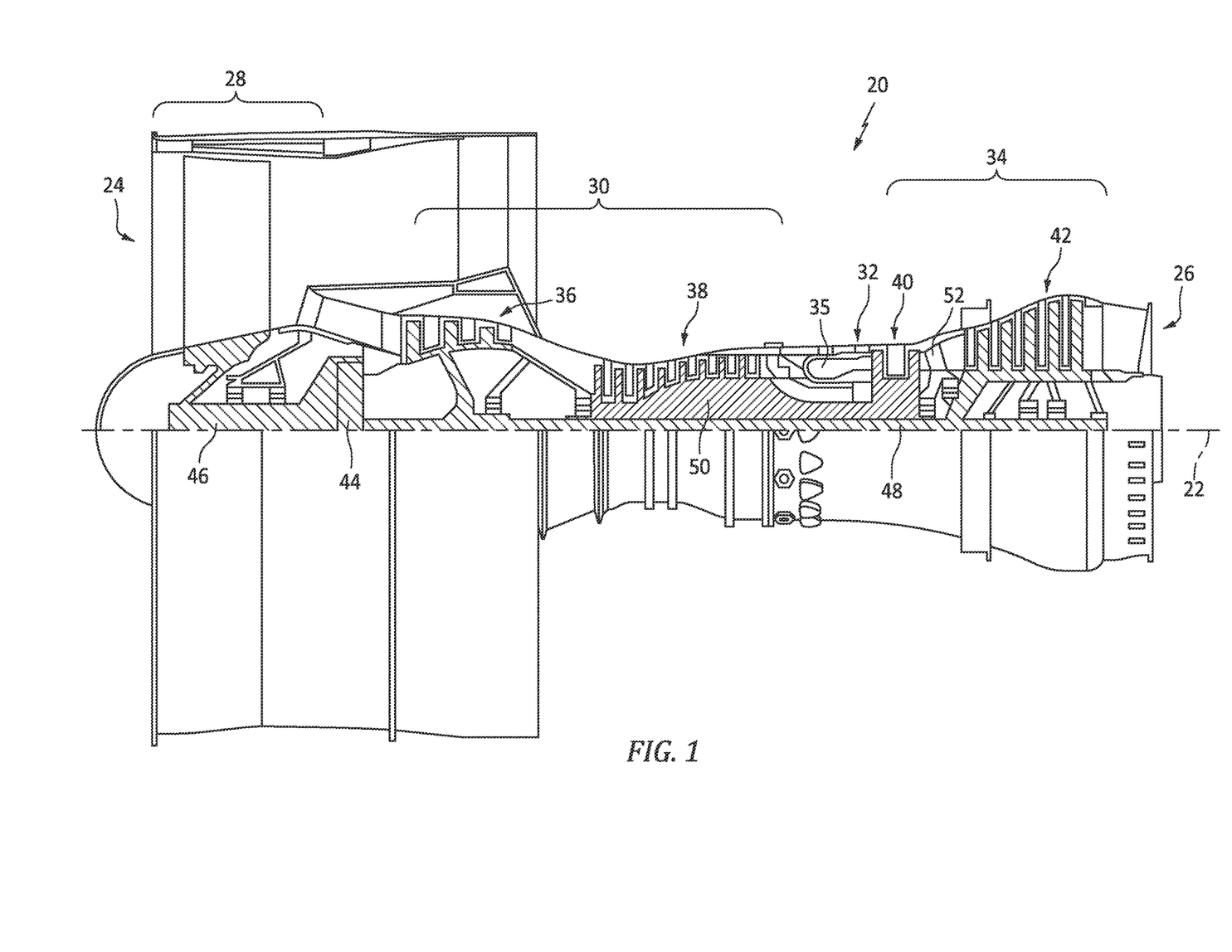
FIG. 1 is a diagrammatic sectional view of a gas turbine engine.

FIG. 1 shows a partially sectioned diagrammatic view of a geared gas turbine engine 20. The gas turbine engine 20 extends along an axial centerline 22 between an upstream airflow inlet 24 and a downstream airflow exhaust 26. The gas turbine engine 20 includes a fan section 28, a compressor section 30, a combustor section 32, and a turbine section 34. The combustor section includes a combustor 35. The compressor section includes a low pressure compressor (LPC) 36 and a high pressure compressor (HPC) 38. The turbine section 34 includes a high pressure turbine (HPT) 40 and a low pressure turbine (LPT) 42. The engine sections are arranged sequentially along the centerline 22 within an engine housing. The fan section 28 is connected to a geared architecture 44, for example, through a fan shaft 46. The geared architecture 44 and the LPC 36 are connected to and driven by the LPT 42 through a low speed shaft 48. The HPC 38 is connected to and driven by the HPT 40 through a high speed shaft 50. The terms "forward", "leading", "aft, "trailing" are used herein to indicate the relative position of a component or surface. As core gas air passes through the engine 20, a "leading edge" of a stator vane or rotor blade encounters core gas air before the "trailing edge" of the same. In a conventional axial engine such as that shown in FIG. 1, the fan section is "forward" of the compressor section and the turbine section is "aft" of the compressor section. The terms "inner radial" and "outer radial" refer to relative radial positions from the engine centerline. An inner radial component or path is disposed radially closer to the engine centerline than an outer radial component or path. For example and as will be described herein, an inner radial side of the bypass TOBI system is disposed closer to the engine centerline than the outer radial side of the bypass TOBI system. The gas turbine engine diagrammatically shown is an example provided to facilitate the description herein. The present disclosure is not limited to any particular gas turbine engine configuration, including the two spool engine configuration shown, and may be utilized with single spool gas turbine engines as well three spool gas turbine engines and the like.

During operation, air enters the gas turbine engine 20 through the airflow inlet 24 and may be directed through the fan section 28 and into a core gas path. The gas traveling along the core gas path is directed through the engine sections 30, 32, 34 and exits the gas turbine engine 20 through the airflow exhaust 26 to provide forward engine thrust. Within the combustor section 32, fuel is injected into a combustion chamber and mixed with compressed air. This fuel-air mixture is ignited to power the gas turbine engine 20. The non-combusted air and combustion products produced in the combustor pass to the turbine section 34 where they power the turbine section.

Figure 2:
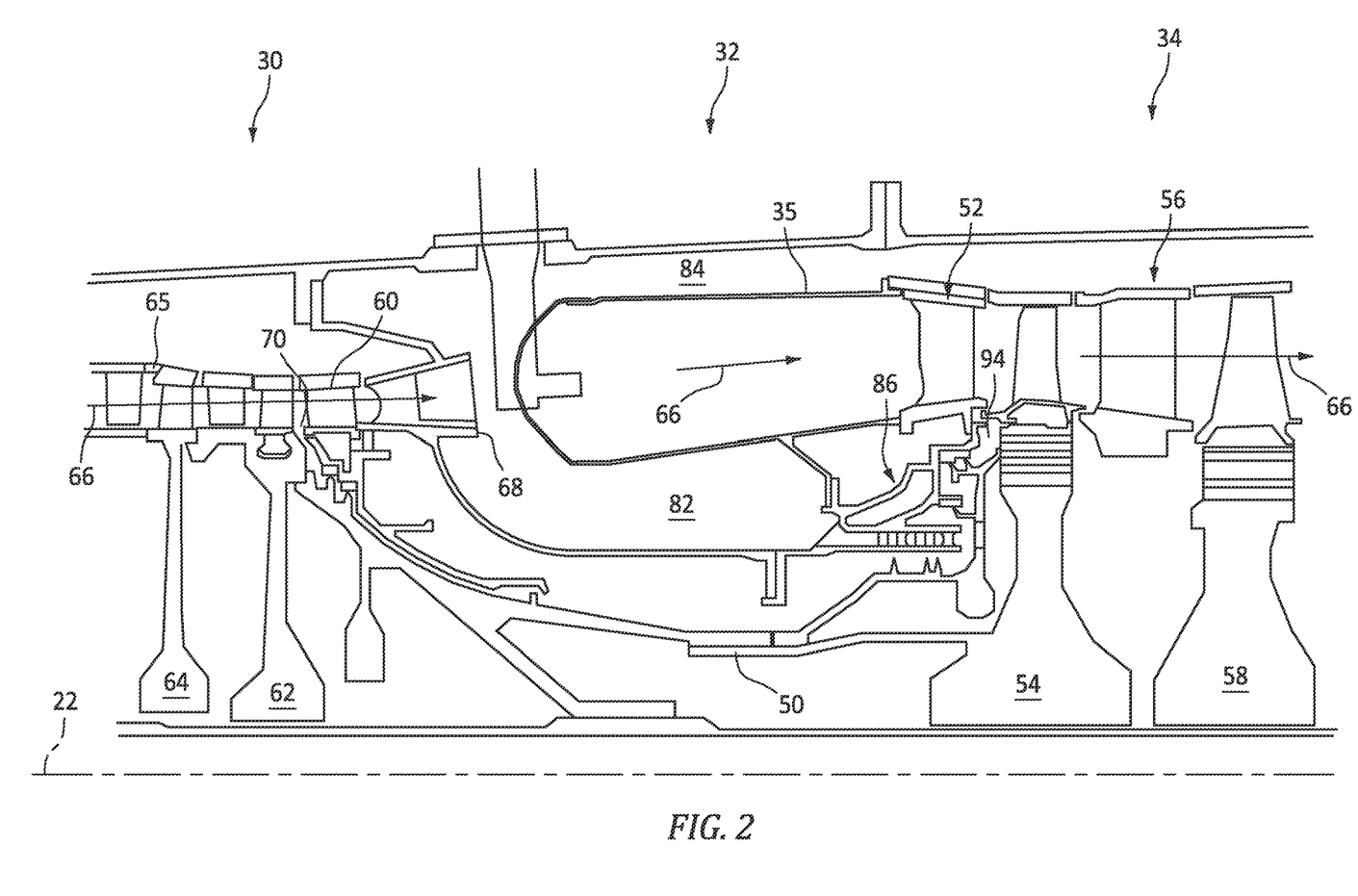
FIG. 2 is a diagrammatic sectioned partial view of a gas turbine engine embodiment.

FIG. 2 is a diagrammatic cross-sectional partial view of a gas turbine engine embodiment according to aspects of the present disclosure. FIG. 2 shows a portion of the HPC 38, the combustor section 32 of the engine 20, and a portion of the turbine section 34. The turbine section 34 includes a plurality of stator vane stages and rotor stages, alternating with one another. Each stator vane stage includes a plurality of stator vanes that extend radially across the core gas path. The stator vanes are circumferentially spaced apart from one another around the engine axial centerline 22. Each rotor stage includes a disk rotatable about the axial centerline of the engine, with a plurality of rotor blades that extend radially out from the disk and into the core gas path. The rotor blades are spaced apart from one another around the circumference of the disk. The number of stator vane stages and rotor stages in a turbine section may vary in different engine models. The partial engine view shown in FIG. 2 includes a first HPT stator vane stage 52 immediately downstream of the combustor section 32, a first HPT rotor stage 54, a second HPT stator vane stage 56, and a second HPT rotor stage 58.

The compressor section 30 includes a plurality of stator vane stages and rotor stages, alternating with one another. The number of stator vane stages and rotor stages in a compressor section may vary in different engine models. The partial engine view shown in FIG. 2 includes the last two HPC rotor stages and the last three HPC stator vane stages immediately upstream of the combustor section 32. For description purposes herein, the HPC rotor stage closest to the combustor section will be referred to as the "Nth" HPC rotor stage 62, and the next HPC rotor stage forward of the Nth HPC rotor stage 62 will be referred to as the "N−1th" HPC rotor stage 64.

Figure 3:
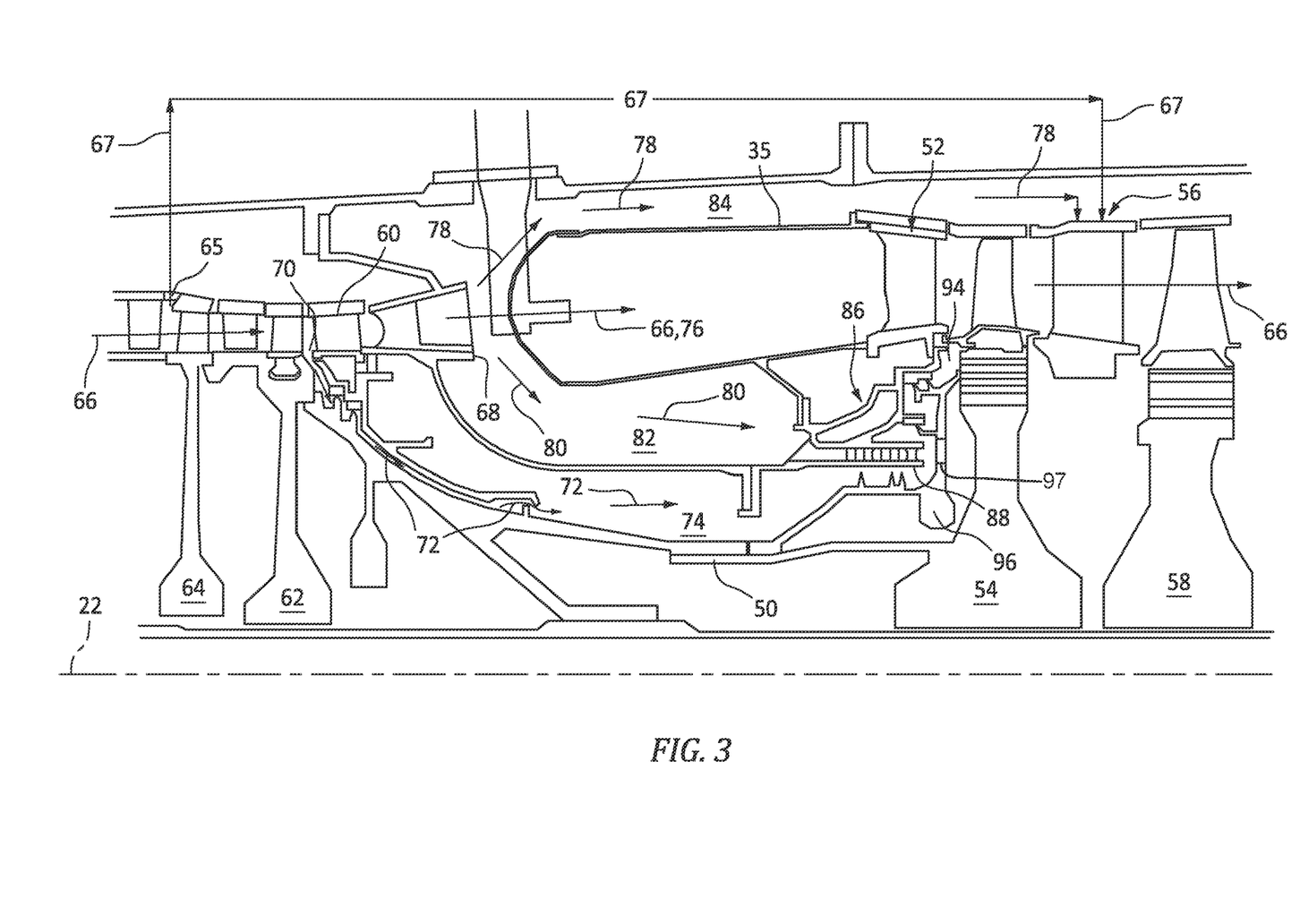
FIG. 3 is a diagrammatic sectioned partial view of a gas turbine engine embodiment shown in FIG. 2, also showing core gas flows.

FIG. 3 is provided to illustrate gas flow paths within the engine embodiment shown in FIG. 2. Embodiments of the present disclosure are configured to bleed gas off the core gas path 66 within the HPC 38 upstream of the HPC discharge 68. The present disclosure is not limited to bleeding gas at any particular location in the HPC 38. As shown diagrammatically in FIG. 3, gas for cooling the HPT components (e.g., the second HPT stator vane stage 56, the blade outer air seal (BOAS) of the second HPT rotor stage 58, and the like) may be bled from gas within the core gas path at a flow path outer diameter position 65 immediately forward of the N−1th HPC rotor stage 64. Specifically, gas may be bled from an outer wall segment forward of the N−1th HPC rotor stage 64. The compressor bled gas (diagrammatically shown by arrow 67) may be routed through one or more passages radially outside of the core gas path 66, and then via external cooling tubes to one or more HPT components. In some embodiments, the gas bled from an outer wall segment at position 65 forward of the N−1th HPC rotor stage 64 may be used for cooling without being mixed with any other gases. In these embodiments, the gas (diagrammatically shown by arrow 67) is at a relatively low temperature which makes it desirable for cooling purposes; e.g., the relatively low temperature air may satisfy the cooling requirements with less volumetric flow bled off the compressor than would be required with a higher temperature gas flow. Decreasing the amount of gas bled off the compressor provides engine performance benefits; e.g., an improved thrust specific fuel consumption (TSFC) of the gas turbine engine.

Embodiments of the present disclosure are configured to utilize gas leakage flow off of the core gas path 66 aft of the Nth HPC rotor stage 62 but upstream of the HPC discharge 68. The gas leakage flow off of the core gas path 66 aft of the Nth HPC rotor stage 62 ("Nth stage HPC gas leakage flow") may be described as exiting through an ID leakage slot 70. The ID leakage slot 70 may assume a variety of different configurations (e.g., circumferentially spaced apart openings, a single continuous circumferential opening, or the like) and the present disclosure is not limited to any particular ID leakage slot 70 configuration. The passage extending from the ID leakage slot 70 disposed in the inner gas path boundary may include one or more seals (e.g., knife-edge seals) for controlling the amount of gas bled/ leaked in this passage. The passage containing Nth stage HPC gas leakage flow 72 (i.e., the "Nth stage HPC leakage flow passage 74") includes a portion disposed radially inside of the combustor section 32; i.e., radially inside of the "inner radial path 82" as will be detailed hereinafter.

Gas exiting the HPC discharge 68 and entering the combustor section 32 may be described as comprising three portions (i.e., combustor primary flow 76, diffuser outer diameter (OD) flow 78, and diffuser inner diameter (ID) flow 80) that travel three different paths through the combustor section 32. The combustor primary flow 76 is that portion of the gas exiting the HPC discharge 68 that follows a path through the combustor 35 where it is mixed with fuel and the mixture combusted. The diffuser OD flow 78 is the portion of the gas exiting the HPC discharge 68 that follows a flow path radially outside of the combustor (i.e., the "outer radial path 84"). At least a portion of the diffuser OD flow 78 may be directed (e.g., via passages disposed outside of the core gas path 66) to HPT components including, but not limited to, the first HPT vane outer diameter, the first HPT rotor BOAS, the second HPT stator vane stage 56, and the like. Portions of the diffuser OD flow 78 may also be used for combustor liner cooling and combustor exit temperature profile tailoring. The present disclosure is not limited to using the diffuser OD flow 78 in any particular manner.

The diffuser ID flow 80 is the portion of the core gas exiting the HPC discharge 68 that follows a flow path radially inside of the combustor 35 (i.e., the "inner radial path 82"). At least a portion of the diffuser ID flow 80 may be directed (e.g., via passages disposed inside of the core gas path 66) to various HPT components including, but not limited to, the first HPT vane inner diameter, the first HPT front rim cavity, the first HPT rotor blade. Portions of the diffuser ID flow 80 may also be used for combustor liner cooling and combustor exit temperature profile tailoring. To reach the HPT first rotor blade, the diffuser ID flow 80 is directed into a Tangential On-Board Injector system (referred to hereinafter as a "bypass TOBI system 86") that includes a plurality of injector nozzles 88. The bypass TOBI system 86 extends circumferentially around the axial centerline 22 of the engine. The bypass TOBI nozzles 88 are disposed at circumferential positions spaced apart from one another around the circumference of the bypass TOBI system 86. Gas passing through the TOBI injector nozzles 88 is swirled and may be directed into the first HPT rotor stage 54 blade for cooling purposes.

Figure 4:
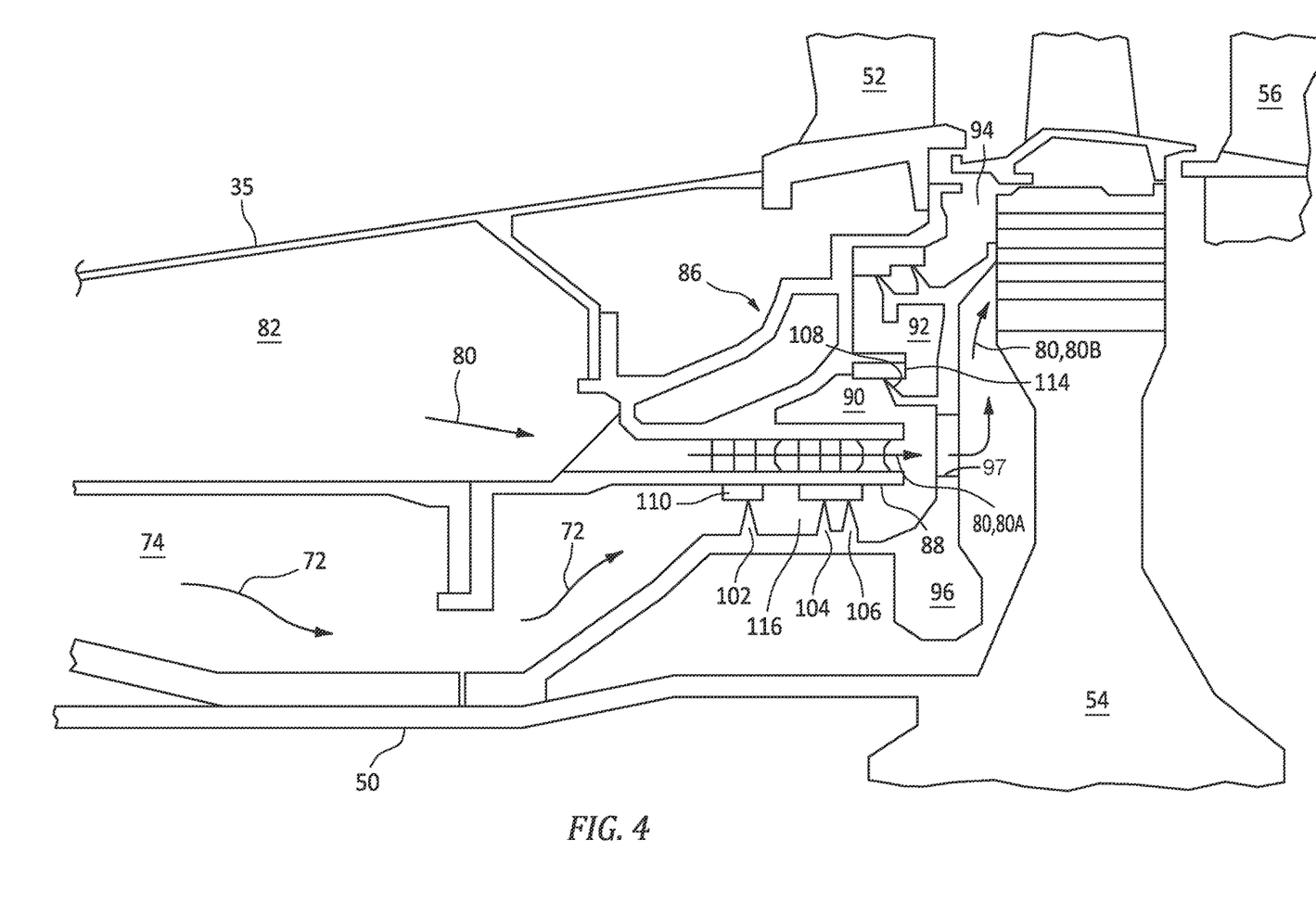
FIG. 4 is an enlarged portion of the gas turbine engine shown in FIG. 2.

The engine configuration shown in FIGS. 2 and 3 includes a rotor disk (referred to hereinafter as the "sideplate minidisk 96") attached to the high speed shaft 50. The sideplate minidisk 96 is designed to retain the first turbine disk sideplate that directs cooling flow into the first blade airfoils and seals this cooling air delivery system from the hot gas path. FIG. 4 is an enlarged diagrammatic view of the bypass TOBI system 86 illustrating diffuser ID flow 80 that passes through the TOBI injector nozzles 88, and is subsequently directed to the first HPT rotor stage 54 for passage into the rotor blades of the first HPT rotor stage 54. Arrows 80A, 80B diagrammatically illustrate diffuser ID flow 80 passing through the TOBI system nozzles 88 and subsequently passing into the rotor blades of the first HPT rotor stage 54 for cooling purposes.

A present disclosure bypass TOBI system 86 is configured with a plurality of passages that allow Nth stage HPC gas leakage flow 72 to pass radially through the bypass TOBI system 86 (from radial inner to radial outer) without mixing with the diffuser ID flow 80 passing through the TOBI nozzles 88. The plurality of passages may include different passage configurations. First passages 122 and second passages 118 (illustrated in FIGS. 5 and 6, respectively) are described herein as non-limiting examples of different passage configurations. Alternative embodiments may have more than two different passage configurations. Each of the passage configurations 118, 122 are repeated at a number of circumferential positions spaced apart from one another around the circumference of the bypass TOBI system 86. FIG. 7 diagrammatically illustrates a non-limiting example of circumferential positioning of TOBI nozzles 88, first passages 122, and second passages 118 in a linear representation. The repeating pattern of a nozzle 88 disposed between a second passage 118 and a first passage 122 as shown in FIG. 7 is just an example. The circumferential positioning of nozzles 88, first passages 122, and second passages 118 may be in a repetitive pattern, or may be in an asymmetrical arrangement; e.g., first passage 122, first passage 122, nozzle 88, second passage 118, nozzle 88, first passage 122, second passage 118, etc. The present disclosure is not limited to any particular circumferential positioning arrangement of TOBI nozzles 88 and TOBI radial passages 122, 118.

As will be described herein, the TOBI radial passages may in part include seal leakage passages and may be configured to produce desirable pressure balances between compartments proximate the bypass TOBI system 86. The aforesaid pressure balances between compartments greatly facilitate or eliminate undesirable gas flow contamination between the compartments.

Figure 5:
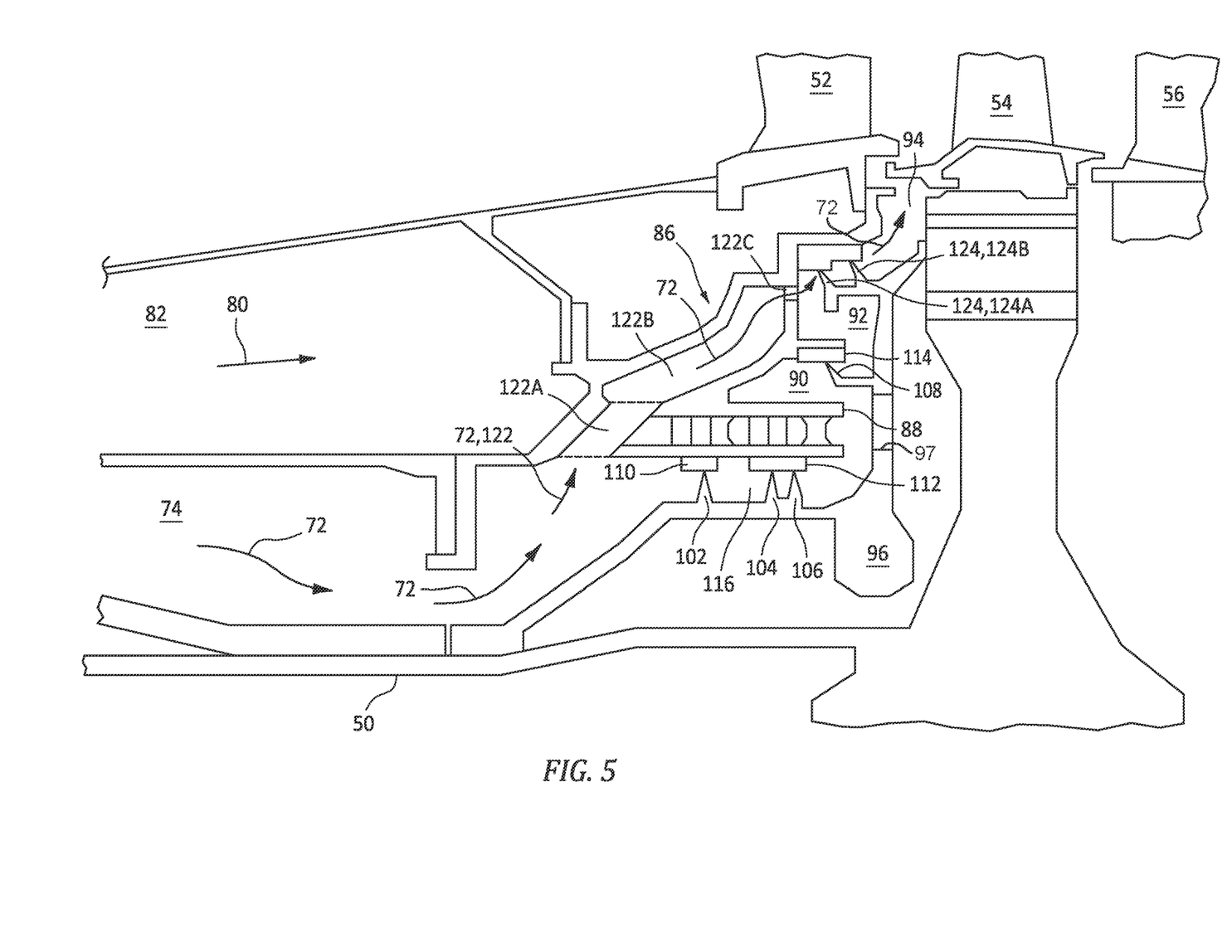
FIG. 5 is an enlarged portion of the gas turbine engine shown in FIG. 2, illustrating an embodiment of a radial passage through the bypass TOBI system.
Figure 6:
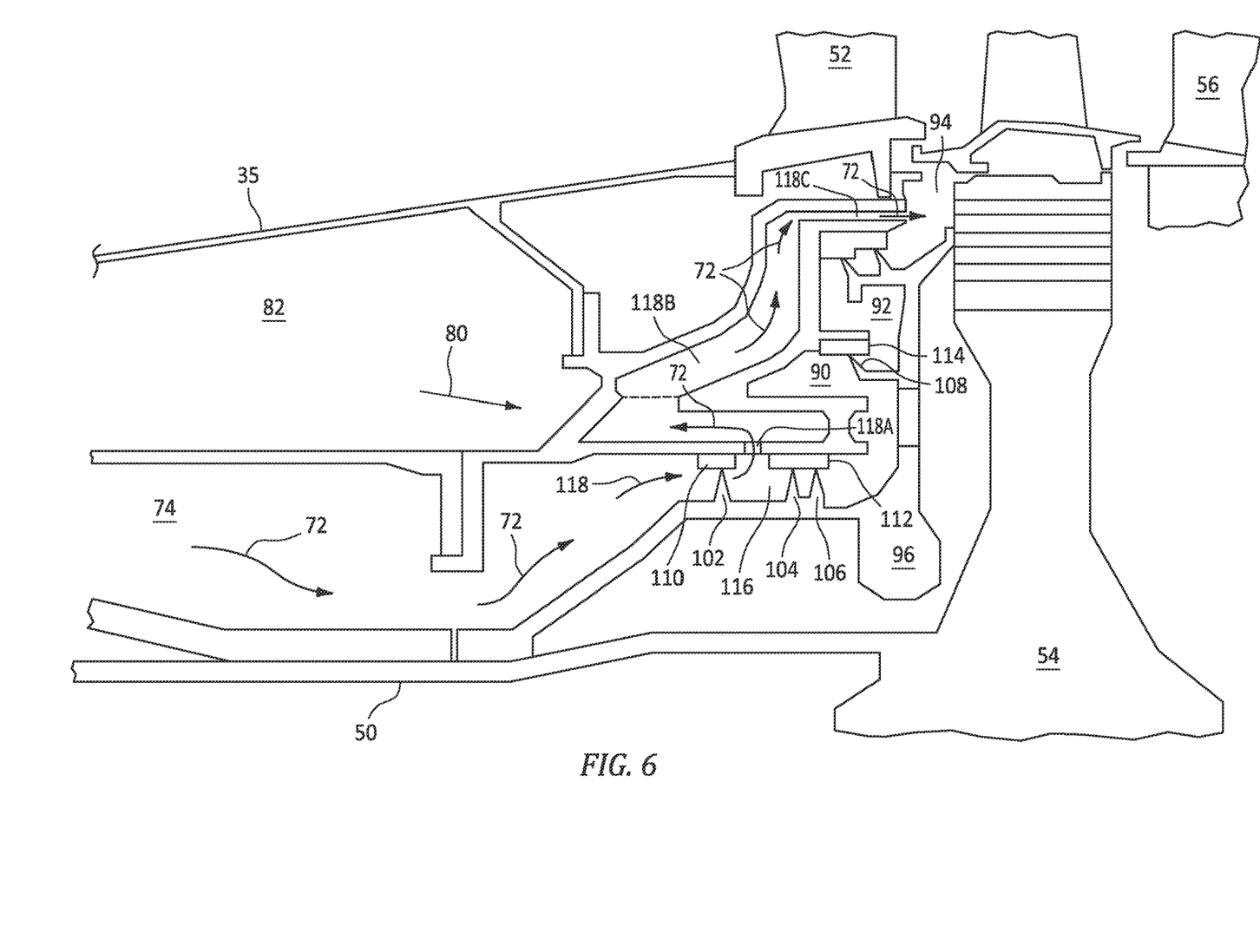
FIG. 6 is an enlarged portion of the gas turbine engine shown in FIG. 2, illustrating an embodiment of another radial passage through the bypass TOBI system.
Figure 7:
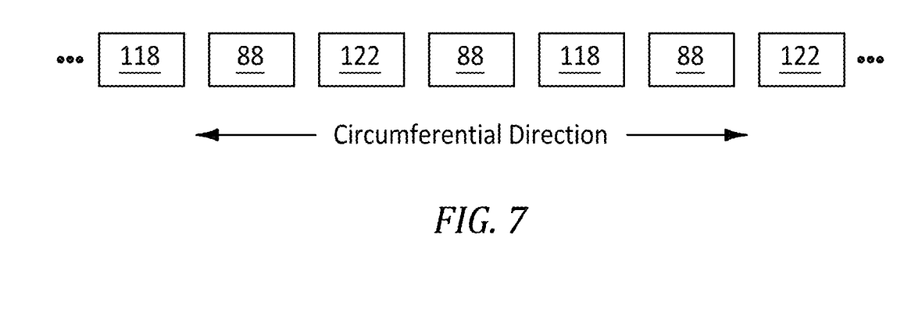
FIG. 7 is a diagrammatic linear representation of circumferential positioning of TOBI nozzles and bypass TOBI system passages.

Referring to FIGS. 4-6, a plurality of seals in communication with the rotor disk are utilized to define compartments proximate the bypass TOBI system 86. The present disclosure system example shown in FIGS. 4-6 includes first, second, and third knife-edge seals 102, 104, 106 disposed radially inward of the TOBI nozzles 88, and a fourth knife-edge seal 108 disposed radially outward of the TOBI nozzles 88. The present disclosure is not limited to any particular knife-edge seal arrangement. The first knife-edge seal 102 is engaged with a first seal member 110 disposed on an inner diameter surface of the bypass TOBI system 86, and the second and third knife-edge seals 104, 106 are engaged with a second seal member 112 disposed on the inner diameter surface of the bypass TOBI system 86. The fourth knife-edge seal 108 is engaged with a third seal member 114 disposed on a structural member disposed radially outside of the bypass TOBI system 86. As can be seen in FIG. 4, the bypass TOBI nozzle 88 (non-rotating) is disposed a distance from the sideplate minidisk 96 and the web of the sideplate minidisk 96 includes a plurality of passages 97 that permit diffuser ID flow 80 exiting the bypass TOBI nozzles 88 to pass therethrough. The second, third, and fourth knife-edge seals 104, 106, 108 in combination with the sideplate minidisk 96 and the bypass TOBI define a compartment 90 that includes the distal ends of the bypass TOBI nozzles 88.

Referring to FIG. 5, a first passage 122 for Nth stage HPC gas leakage flow 72 passing radially through the bypass TOBI system 86 includes a passage portion 122A disposed at a forward end of the bypass TOBI system 86 that extends radially through the bypass TOBI system 86. This passage portion 122A avoids Nth stage HPC gas leakage flow 72 engagement with the first, second, and third knife-edge seals 102, 104, 106. The Nth stage HPC gas leakage flow 72 passing through the forward passage portion 122A (at a plurality of different circumferential positions), passes through into passage portion 122B, disposed radially outside of the bypass TOBI system 86, and then into passage portion 122C (which may be configured as a flow metering orifice), ultimately dumping into TOBI OD compartment 92 that is defined by at least one seal 124 (the example in FIG. 5 shows two knife-edge seals 124A, 124B) and the fourth knife-edge seal 108. In some embodiments, passage portion 122C may be oriented (e.g., skewed relative to the rotational axis of the engine) such that gas exits the passage portion 122C in a circumferential direction that at least partially agrees with the rotational direction of the rotor portions. The first passage 122 includes a leak path past the seal 124. The Nth stage HPC gas leakage flow 72 disposed in the compartment 92 leaks past the seal 124 (e.g., knife-edge seals 124A, 124B) and enters a cavity disposed forward of the first HPT rotor stage 54 (i.e., the "FS-HPT rotor forward rim cavity 94") and thereafter passes into the core gas path 66 forward of the first HPT rotor stage 54.

Referring to FIG. 6, a second passage 118 for Nth stage HPC gas leakage flow 72 to pass radially through the bypass TOBI system 86 includes a leak path through the first knife-edge seal 102 into the annular region 116 disposed between the first knife-edge seal 102 and the second knife-edge seal 104. The Nth stage HPC gas leakage flow 72 in the annular region 116 disposed between the first knife-edge seal 102 and the second knife-edge seal 104 subsequently travels radially through a passage portion 118A disposed in the bypass TOBI system 86, and subsequently enters another passage portion 118B disposed radially outside of the bypass TOBI system 86. The Nth stage HPC gas leakage flow 72 subsequently travels through another passage portion 118C (which may be configured as a flow metering orifice) disposed radially below the first HPT stator vane stage 52 before entering the FS-HPT rotor forward rim cavity 94 and thereafter passing into the core gas path 66 forward of the first HPT rotor stage 54. In some embodiments, passage portion 118C may be oriented (e.g., skewed relative to the rotational axis of the engine) such that gas exits the passage portion 118C in a circumferential direction that at least partially agrees with the rotational direction of the rotor portions.

The configurations of the first and second passages 122, 118 described above that permit Nth stage HPC gas leakage flow 72 to pass radially through the bypass TOBI system 86 are provided herein as representative passage configurations and the present disclosure is not intended to be limited thereto.

The first and second passages 122, 118 provide several benefits relating to controlling gas flow into or out of the compartments proximate the bypass TOBI system 86. For example, as described above diffuser ID flow 80 is directed through the TOBI nozzles 88. Some amount of the diffuser ID flow 80 passes through the passages 97 disposed in the web of the sideplate minidisk 96 and some amount of the diffuser ID flow 80 is present within the chamber 90. The second, third and fourth knife-edge seals 104, 106, 108 define chamber 90 and inhibit fluid flow into or out of chamber 90. Specifically, the second and third knife-edge seals 104, 106 inhibit fluid flow between chamber 90 and annular region 116. Diffuser ID flow 80 is present within chamber 90 and Nth stage HPC gas leakage flow 72 is present within annular region 116. The second passage 118 that provides Nth stage HPC gas leakage flow 72 within the annular region 116 disposed between the first knife-edge seal 102 and the second knife-edge seal 104 also inhibits fluid flow between chamber 90 and annular region 116; e.g., by creating a minimal or zero pressure difference across (e.g., a pressure balance across) the second and third knife-edge seals 104, 106. The minimal or zero pressure difference across the second and third knife-edge seals 104, 106 may be facilitated by flow characteristics within the second passage. As indicated above, in some embodiments, passage portion 118C may be configured as a flow metering orifice that influences the gas pressure within the annular region 116, and the consequent minimal or zero pressure difference across the second and third knife-edge seals 104, 106. Passage portion 118C configured as a flow metering orifice is a nonlimiting example of a passage 118 feature that may be used to produce a minimal or zero pressure difference across the ID of the bypass TOBI system and the present disclosure is not limited thereto.

As another example and as described herein, the fourth knife-edge seal 108 is one of the seals that defines chamber 90. Specifically, fourth knife-edge seal 108 inhibits fluid flow between chamber 90 and chamber 92. Diffuser ID flow 80 is present within chamber 90 and Nth stage HPC gas leakage flow 72 is present within chamber 92. The first passage 122 that provides Nth stage HPC gas leakage flow 72 within chamber 92 also inhibits fluid flow between chamber 90 and chamber 92; e.g., by creating a minimal or zero pressure difference across (or a pressure balance across) the fourth knife-edge seal 108. The minimal or zero pressure difference across the fourth knife-edge seal 108 may be facilitated by flow characteristics within the first passage 122. As indicated above, in some embodiments, passage portion 122C may be configured as a flow metering orifice that influences the gas pressure within compartment 92, and the consequent minimal or zero pressure difference across the fourth knife-edge seal 108. Passage portion 122C configured as a flow metering orifice is a nonlimiting example of a passage 122 feature that may be used to produce a minimal or zero pressure difference across the OD of the bypass TOBI system and the present disclosure is not limited thereto.

From the above it can be seen that the first and second passages 122, 118 configurations are useful to prevent intermixing of Nth stage HPC gas leakage flow 72 and diffuser ID flow 80 proximate the bypass TOBI system. In this manner, the Nth stage HPC gas leakage flow 72 and its properties (i.e., pressure and temperature) can be directed to an intended location (e.g., the FS-HPT rotor forward rim cavity 94) and diffuser ID flow 80 and its properties can be directed to an intended location (e.g., the first HPT rotor stage 54). Hence, the present disclosure creates a substantial pressure-balance across the bypass TOBI system that allows the usage of all of the relatively hot HPC rear-hub leakage flow 72 to be used as a HPT front rim cavity purge instead of using relatively cool cooling air sourced elsewhere (e.g., from the HPT first vane ID cavity) supplemented with even cooler TOBI ID/OD leakage flow (e.g., leaked diffuser ID flow 80).

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently.

In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible.

The invention claimed is:

1. A gas turbine engine having an axial centerline, comprising:
   a high-pressure compressor (HPC) having an HPC rotor stage and an HPC stator vane stage, the HPC rotor stage having a disk and a plurality of HPC rotor blades, and the HPC stator vane stage having a plurality of HPC stator vanes, the HPC having an HPC discharge at an aft end of the HPC;
   a combustor section having a combustor;
   a high-pressure turbine (HPT) having an HPT rotor stage and an HPT stator vane stage, the HPT rotor stage having a disk and a plurality of HPT rotor blades, and the HPT stator vane stage having a plurality of HPT stator vanes;
   wherein a core gas path extends through the HPC, the combustor section, the HPT, and exits through the HPC discharge;
   wherein a gas leakage flow is a bled gas off of the core gas path forward of the HPC discharge;
   a bypass tangential on board injector (TOBI) system that extends circumferentially around the engine axial centerline, the bypass TOBI system having a plurality of nozzles, an inner radial side, an outer radial side, a plurality of first radial passages, and a plurality of second radial passages,
   wherein the gas turbine is configured such that a portion of core gas exiting the core gas path through the HPC discharge is directed to the bypass TOBI system as a diffuser inner diameter (ID) flow that passes through the plurality of nozzles,
   wherein the configuration of the plurality of first radial passages is different from the configuration of the plurality of second radial passages where the second radial passages each have a fluid flow path that directs the bled gas in an upstream direction with respect to the ID flow and the first radial passages do not direct the bled gas in the upstream direction,
   wherein the plurality of first radial passages are configured to allow the bled gas from the HPC to pass from the inner radial side of the bypass TOBI system to the outer radial side of the bypass TOBI system without mixing with the diffuser ID flow passing through the plurality of nozzles,
   and wherein the plurality of second radial passages are configured to allow the bled gas from the HPC to pass from the inner radial side of the bypass TOBI system to the outer radial side of the bypass TOBI system without mixing with the diffuser ID flow passing through the plurality of nozzles.

2. The gas turbine engine of claim 1, further comprising a first gas port in communication with the HPC, the first gas port configured to receive the bled gas, and a first HPC gas passage that provides fluid communication between the first gas port and the bypass TOBI system.

3. The gas turbine engine of claim 2, wherein the HPC has "N" number of HPC rotor stages, wherein "N" is an integer equal to or greater than two, and the "N" number of HPC rotor stages includes a first HPC rotor stage disposed closest to an axial forward end of the HPC and an Nth HPC rotor stage that is the HPC rotor stage closest to the HPC discharge;

wherein the first gas port is disposed in the HPC aft of the Nth HPC rotor stage.

4. The gas turbine engine of claim 3, wherein the first gas port and the first HPC gas passage are configured such that substantially all of the bled gas received by the first gas port is directed to pass from the inner radial side of the bypass TOBI system to the outer radial side of the bypass TOBI system.

5. The gas turbine engine of claim 4, wherein the HPT stator vane stage includes a first HPT stator vane stage disposed adjacent the combustor section and the HPT rotor stage is a first HPT rotor stage disposed aft of the first HPT stator vane stage, and a FS-HPT rotor forward rim cavity is disposed aft of the first HPT stator vane stage, forward of the first HPT rotor stage, and radially inside of the core gas path; and the gas turbine engine is configured such that the bled gas is directed into the FS-HPT rotor forward rim cavity for exit into the core gas path forward of the first HPT rotor stage after passing radially through the bypass TOBI system.

6. The gas turbine engine of claim 5, wherein the combustor section includes a diffuser outer diameter (OD) flow path disposed radially outside of the combustor, and wherein the diffuser ID flow passes though a diffuser inner diameter (ID) flow path disposed radially inside of the combustor.

7. The gas turbine engine of claim 6, wherein the combustor section is configured such that a first portion of gas exiting the HPC discharge is directed into the diffuser OD flow path; and the engine is configured to direct the first portion of gas outside of the core gas path to the HPT.

8. The gas turbine engine of claim 7, wherein the HPT further includes a second HPT stator vane stage disposed aft of the first HPT rotor stage; and at least a portion of the first portion of gas exiting the HPC discharge is directed to the second HPT stator vane stage.

9. The gas turbine engine of claim 6, wherein the diffuser ID flow path is in fluid communication with the plurality of nozzles of the bypass TOBI system to direct the diffuser ID flow through the plurality of nozzles;

wherein the engine is configured to direct the diffuser ID flow to the first HPT rotor stage.

10. The gas turbine engine of claim 9, wherein the plurality of first radial passages are circumferentially spaced apart from one another around the bypass TOBI system, and the plurality of second radial passages are circumferentially spaced apart from one another around the bypass TOBI system.

11. The gas turbine engine of claim 10, wherein the plurality of first radial passages are disposed at a forward end of the bypass TOBI system and radially through the bypass TOBI system to a first outer radial compartment.

12. The gas turbine engine of claim 11, wherein a plurality of seals are disposed on the inner radial side of the bypass TOBI system and are engaged with an inner radial surface of the bypass TOBI nozzles, wherein a first seal of the plurality of seals and a second seal of the plurality of seals are spaced apart from one another and define an annular region therebetween;

wherein said second radial passages extend from the annual region and radially through the bypass TOBI system to a second outer radial compartment.

13. The gas turbine engine of claim 2, wherein the HPC has "N" number of HPC rotor stages, wherein "N" is an integer equal to or greater than two, and the "N" number of said HPC rotor stages includes a first HPC rotor stage disposed closest to an axial forward end of the HPC, an Nth HPC rotor stage that is the HPC rotor stage closest to the HPC discharge, and an N−1th HPC rotor stage disposed between the first HPC rotor stage and the Nth HPC rotor stage; and a second gas port in communication with the HPC, the second gas port configured to receive gas from the core gas path forward of the N−1th HPC rotor stage; and wherein the gas received from the second gas port (HPC bleed gas) is routed through a passage disposed radially outside of the core gas path to the HPT.

14. The gas turbine engine of claim 13, wherein the second gas port is in communication with an outer wall segment forward of the N−1th HPC rotor stage; and the HPC bleed gas received from the second gas port is routed to the HPT in unmixed form.

15. A gas turbine engine having an axial centerline, comprising:

a high pressure compressor (HPC);
a combustor section having a combustor;
a high pressure turbine (HPT);
wherein a core gas path extends through the HPC, the combustor section, the HPT, and exits through an HPC discharge;
wherein a gas leakage flow is a bled gas off of the core gas path forward of the HPC discharge;
a bypass tangential on board injector (TOBI) system that extends circumferentially around the engine axial centerline, the bypass TOBI system having a plurality of nozzles, an inner radial side, an outer radial side, a plurality of first radial passages, and a plurality of second radial passages,
wherein the gas turbine is configured such that a portion of core gas exiting the core gas path through the HPC discharge is directed to the bypass TOBI system as a diffuser inner diameter (ID) flow that passes through the plurality of nozzles,
wherein the configuration of the plurality of first radial passages is different from the configuration of the plurality of second radial passages where the second radial passages each have a fluid flow path that directs the bled gas in an upstream direction with respect to the ID flow and the first radial passages do not direct the bled gas in the upstream direction,
wherein the plurality of first radial passages are configured to allow the bled gas from the HPC to pass from the inner radial side of the bypass TOBI system to the outer radial side of the bypass TOBI system without mixing with the diffuser ID flow passing through the plurality of nozzles,
and wherein the plurality of second radial passages are configured to allow the bled gas from the HPC to pass from the inner radial side of the bypass TOBI system to the outer radial side of the bypass TOBI system without mixing with the diffuser ID flow passing through the plurality of nozzles.

16. The gas turbine engine of claim 15, further comprising a first gas port in communication with the HPC, the first gas port configured to receive the bled gas, and an HPC gas passage that provides fluid communication between the first gas port and the bypass TOBI system;

wherein the HPC has "N" number of said HPC rotor stages, wherein "N" is an integer equal to or greater than two, and the "N" number of said HPC rotor stages includes a first HPC rotor stage disposed closest to an axial forward end of the HPC and an Nth HPC rotor stage that is the HPC rotor stage closest to the HPC discharge;

wherein the first gas port is disposed in the HPC aft of the Nth HPC rotor stage; and wherein the first gas port and the HPC gas passage are configured such that substantially all of the bled gas received by the first gas port is directed to pass from the inner radial side of the bypass TOBI system to the outer radial side of the bypass TOBI system.

17. The gas turbine engine of claim 16, wherein a plurality of HPT stator vane stages includes a first HPT stator vane stage disposed adjacent the combustor section and a plurality of HPT rotor stages includes a first HPT rotor stage disposed aft of the first HPT stator vane stage, and a FS-HPT rotor forward rim cavity is disposed aft of the first HPT stator vane stage, forward of the first HPT rotor stage, and radially inside of the core gas path; and the gas turbine engine is configured such that the bled gas is directed into the FS-HPT rotor forward rim cavity for exit into the core gas path forward of the first HPT rotor stage after passing radially through the bypass TOBI system.

18. The gas turbine engine of claim 15, wherein each of the first radial passages includes a first seal leak path portion disposed on the outer radial side of the bypass TOBI system.

19. The gas turbine engine of claim 18, wherein each of the second radial passages includes a second seal leak path portion disposed on the inner radial side of the bypass TOBI system.

20. A method for operating the gas turbine engine of claim 1, the method comprising:

receiving gas from the HPC;

passing the HPC gas radially through the bypass TOBI system from the inner radial side to the outer radial side, wherein the HPC gas passes through the bypass TOBI system from the inner radial side to the outer radial side by way of the plurality of first radial passages and the plurality of second radial passages, the plurality of first radial passages and the plurality of second radial passages independent of one another; and purging a cavity disposed between a first the HPT stator vane stage and a first the HPT rotor stage with the HPC gas, the HPC gas entering the core gas path forward of the first HPT rotor stage thereafter.

* * * * *